J. G. Borden.
Soldering Tin Cans.
No. 74290          Patented Feb. 11, 1868.
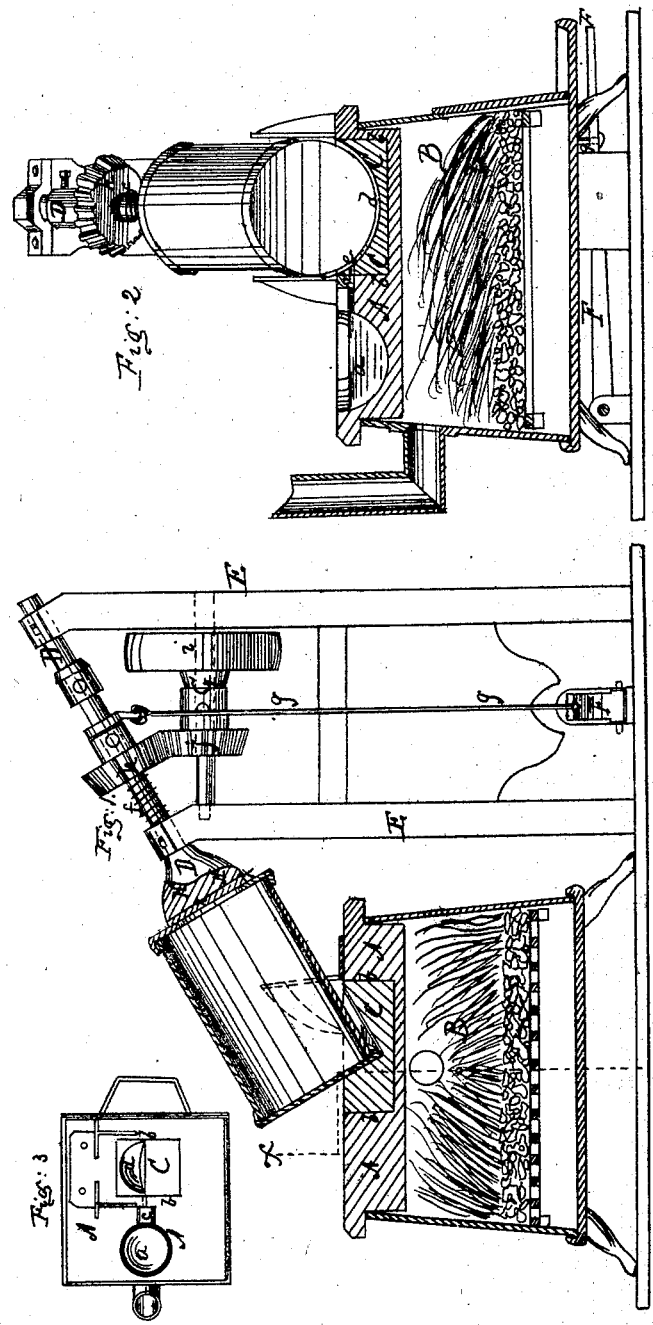
Witnesses:
Theo Tusche
Wm Trewin
Inventor:
Jno G Borden
Per
Attorneys

United States Patent Office.

JOHN G. BORDEN, OF BREWSTER STATION, NEW YORK.

*Letters Patent No. 74,290, dated February 11, 1868.*

IMPROVEMENT IN MACHINE FOR SOLDERING TIN CANS.

The Schedule referred to in these Letters Patent and making part of the same.

TO ALL WHOM IT MAY CONCERN:

Be it known that I, JOHN G. BORDEN, of Brewster Station, in the county of Putnam, and State of New York, have invented a new and improved Machine for Soldering Tin Cans; and I do hereby declare that the following is a full, clear, and exact description thereof, which will enable others skilled in the art to make and use the same, reference being had to the accompanying drawings, forming part of this specification.

Figure 1 represents a side elevation, partly in section, of my invention.

Figure 2 is a vertical transverse section of the same, the plane of section being indicated by the line $x \, x$, fig. 1.

Figure 3 is a plan or top view, on a reduced scale, of the solder-receptacles.

Similar letters of reference indicate corresponding parts.

This invention relates to a new apparatus for soldering tin cans, or all other metal cans which have round heads.

The invention consists, first, in the use of a cast-iron plate, which has two depressions, one of which holds the solder, while a copper block is placed into the other. In the copper block is a recess, which communicates with the solder-reservoir, and as the iron plate is heated by a fire under it, the solder flows from the reservoir into the recess in the copper block, standing in the latter at a desired level. The edge of a tin can to be soldered is placed into the recess in the copper block, and, as the can is revolved by suitable machinery, its edge takes up as much solder as is necessary to firmly unite the head with the side.

The invention also consists in the device for holding and revolving the tin can. The same consists of a sliding shaft, which is by a spring held out of gear, but which, when moved by a treadle or suitable lever, is thrown into gear with another revolving shaft, and is thereby also rotated. This shaft is inclined, and has a pad at its lower end, between which and the inclined bottom of the recess in the copper block, the can is held, and as the pad is revolved with the shaft the can is also carried round.

A represents a cast-iron plate, of suitable size and shape. The same is placed upon a stove or heating-apparatus, B, of suitable construction, forming the cover of the same. Two recesses, $a$ and $b$, are formed or countersunk in the plate A, as shown in fig. 2, both communicating with each other by means of a channel, $c$. C is a block, of copper or other suitable material, of the same shape and size as the cavity $b$, and is placed into the said cavity so as to exactly fill the same. A cavity, $d$, is formed in the block C. The shape of this cavity is like that of a section of a cylinder, formed by passing a plane, at an angle of about sixty degrees, through the base and convex side of a cylinder, the segment of the base being less than half the base. The can to be soldered is of the same diameter as the cylinder from which the cavity $d$ is formed, and thus different blocks, C, must be used for cans of different diameters. A channel, $e$, leads from the cavity $d$ to the outside of the block C, and forms an extension of the channel $c$, so that the cavities $a$ and $d$ are connected with each other. Solder is placed into the receptacle $a$, and is melted by the fire under the plate A, and flows through the channel $c \, e$ into the cavity $d$. D is an inclined shaft, having its bearings in a stationary frame, E, the angle which the shaft D forms with a horizontal line being about thirty degrees. The shaft D slides on its bearings, and is by a spring, $f$, thrown up, unless it is thrown down by means of a lever, $g$, and treadle, F, or by any other suitable device. $h$ is a gear-wheel, mounted on the shaft D. G is a horizontal or other shaft, having its bearings in the frame E, and receiving rotary motion by means of a belt passing over a pulley, $i$. $j$ is a gear-wheel, mounted upon the shaft G. When the shaft D is thrown up by the action of the spring $f$, the wheels $h$ and $j$ are not in gear with each other, but when the shaft D is drawn down by means of the treadle F, the wheels $h$ and $j$ will mesh into each other, as shown in fig. 1, and rotary motion will thereby be imparted to the shaft D. At the lower end of the shaft D is secured a flat disk, H, having a leather or rubber covering, K.

The can to be soldered is placed against the disk K H when the shaft D is up. Then the treadle is brought down, and the shaft is drawn down so that the can will be held between the plate K H and the "base" of the cavity $d$. As the copper block C contains the liquid solder in its cavity $d$, into which the can is held, the solder will be spread over the edge of the can as the same is revolved by the action of the shaft D. The block C being hot heats the can, and the same will therefore take up the solder. The solder will also flow through crevices into the inside of the can, and will thus solder the same from the inside and outside. The reservoir $a$ should be kept filled by an automatic device, so as to have the solder always at the same level. The best device would be to have a reservoir containing liquid solder above the reservoir $a$, and to let the solder flow into the reservoir $a$ in a continuous but small stream, or in drops at regular intervals.

By this invention the tedious soldering by hand will be overcome, and tin cans will be soldered with greater dispatch, regularity, and accuracy.

Having thus described my invention, I claim as new, and desire to secure by Letters Patent—

1. The plate A, provided with two recesses or reservoirs, $a$ and $b$, for holding the solder and block C, respectively, substantially as herein shown and described.

2. The block C, when made to fit the recess $b$ in the plate A, and when provided with a recess or cavity, $d$, to receive the edge of the can to be soldered, substantially as herein shown and described.

3. The arrangement of the recesses $c$ and $e$, whereby the cavity $d$ in the block C is connected with the solder-reservoir $a$, substantially as herein shown and described.

JOHN G. BORDEN.

Witnesses:
    ALEX. F. ROBERTS,
    J. M. COVINGTON.